United States Patent [19]
Thompson

[11] 3,758,967
[45]* Sept. 18, 1973

[54] YARD MAINTENANCE APPARATUS
[75] Inventor: David R. Thompson, Denver, Colo.
[73] Assignee: Rental Equipment Manufacturing Co., Denver, Colo.
[ * ] Notice: The portion of the term of this patent subsequent to May 25, 1988, has been disclaimed.
[22] Filed: May 14, 1971
[21] Appl. No.: 149,400

Related U.S. Application Data
[63] Continuation-in-part of Ser. No. 843,608, July 22, 1969, Pat. No. 3,579,702.

[52] U.S. Cl............ 37/43 E, 15/79, 56/16.7
[51] Int. Cl............................................ E01h 5/09
[58] Field of Search............ 15/49 R, 49 C, 50 R, 15/50 C, 79, 82–86, 340; 74/15.63, 15.84; 37/43 R, 43 A–43 L; 180/53 D

[56] References Cited
UNITED STATES PATENTS

| | | | |
|---|---|---|---|
| 1,492,407 | 4/1924 | Tolliver............ | 74/15.63 X |
| 2,046,679 | 7/1936 | Furstnow............ | 15/83 |
| 2,194,297 | 3/1940 | Drumm............ | 15/83 |
| 2,251,523 | 8/1941 | Patterson............ | 74/15.84 X |
| 2,263,722 | 11/1941 | Drumm............ | 15/83 |
| 3,580,351 | 5/1971 | Mollen............ | 37/43 E X |

Primary Examiner—Edward L. Roberts
Attorney—Van Valkenburgh and Lowe

[57] ABSTRACT

A self-propelled wheel mounted yard maintenance apparatus carrying an engine to drive the unit and a working element which may be a sweeper brush, a snowplow, a lawn mower or the like. The working element is direct-connected to the engine and is adapted to be rotated to function as the apparatus is moved across a yard. The apparatus includes a pair of drive wheels mounted upon a shaft to rotate to propel the unit. A differential is carried upon a driven shaft connected to the engine and a driving shaft connected to the drive wheel shaft. The differential is free to rotate upon these shafts and when rotating freely, it does not apply any driving torque to the driving shaft. A brake is provided to reduce the rate of rotation of this differential or to stop its rotation completely and in either case, the braking action will impart driving torque to the driving shaft. The driving shaft rotates in a direction opposite to the driven shaft when so restrained by the brake. The working element may rotate in a direction opposite to the direction of rotation of the drive wheels or in the same direction of rotation by the addition of reversing gears in the mechanisms between the engine and the working element.

15 Claims, 19 Drawing Figures

3,758,967

INVENTOR.
David R. Thompson

Fig II

INVENTOR.
David R. Thompson
BY
Van Valkenburgh & Lowe
ATTORNEYS

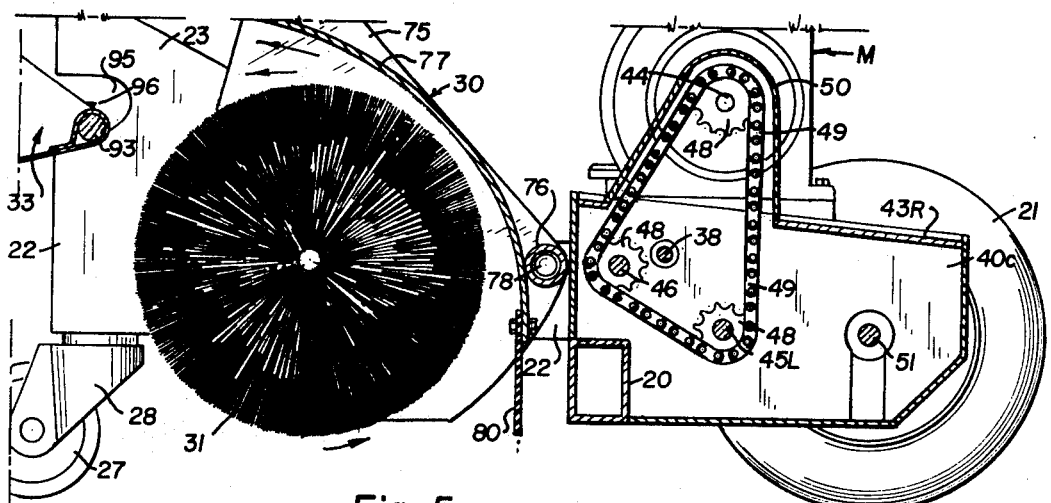
Fig. 5
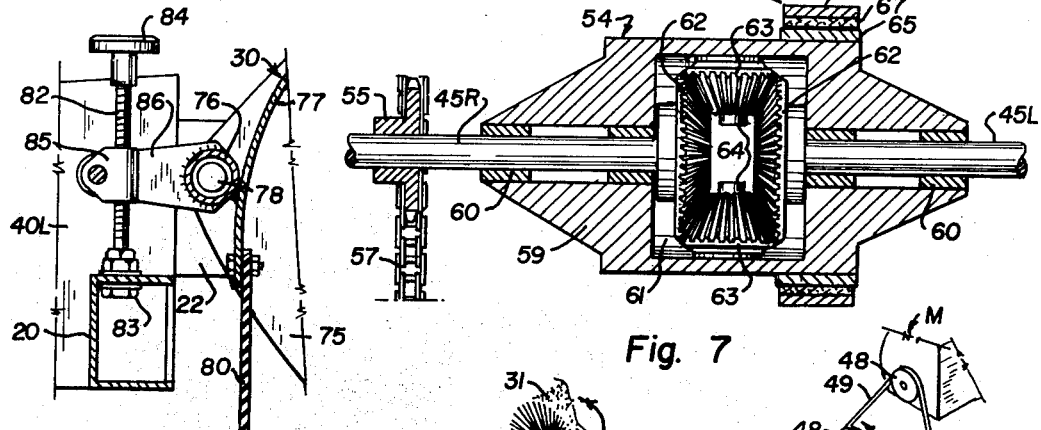
Fig. 6    Fig. 7
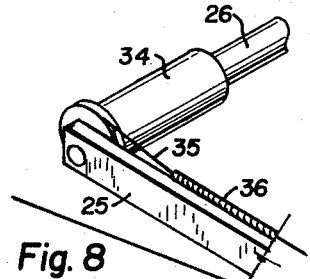
Fig. 8
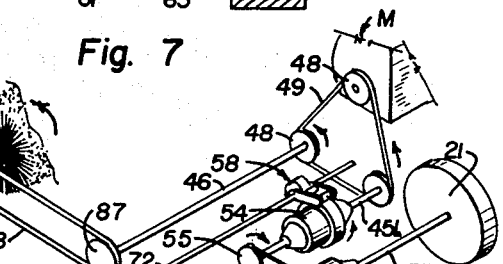
Fig. 10
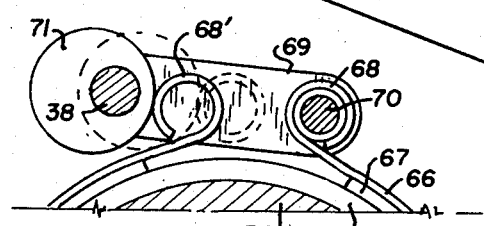
Fig. 9
INVENTOR.
David R. Thompson
BY Van Valkenburgh & Lowe
ATTORNEYS
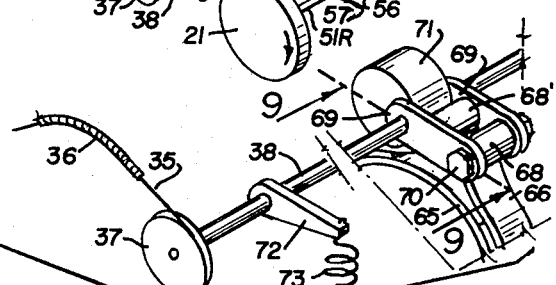

PATENTED SEP 18 1973
3,758,967
SHEET 4 OF 5
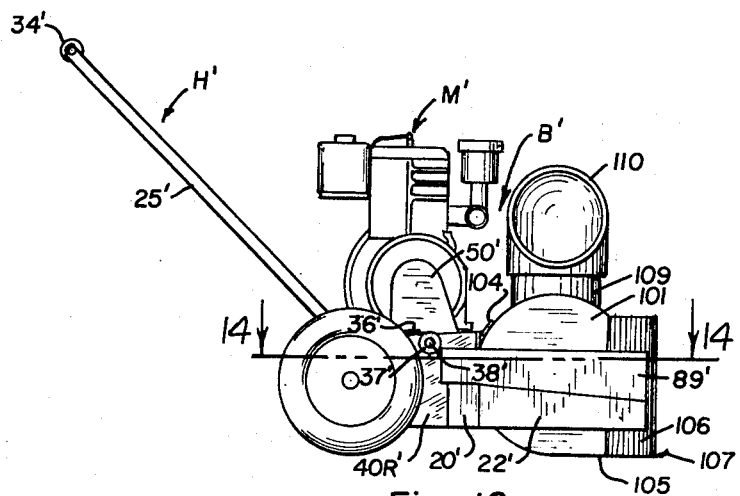
Fig. 12
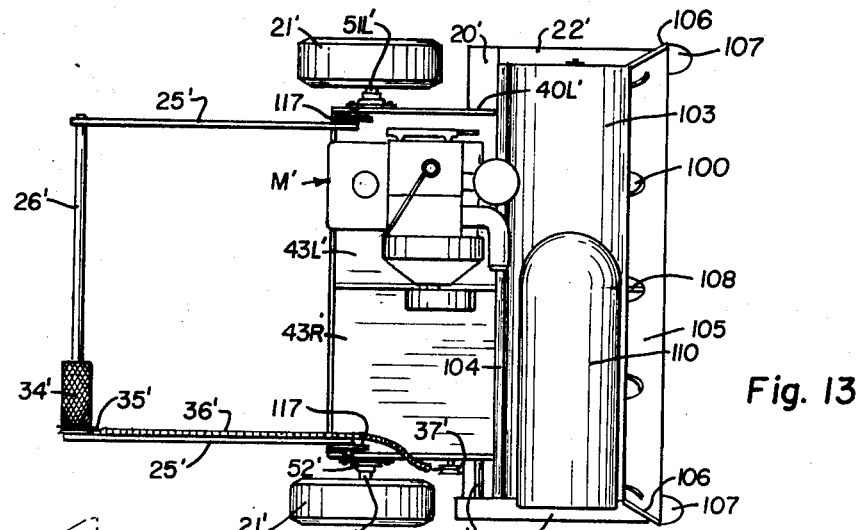
Fig. 13
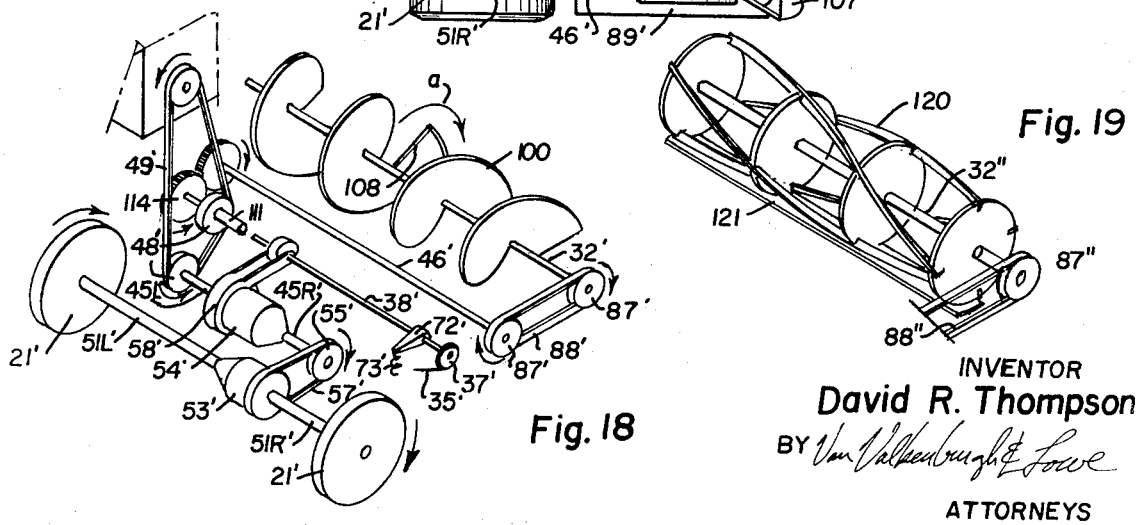
Fig. 18
Fig. 19
INVENTOR
David R. Thompson
BY Van Valkenburgh & Lowe
ATTORNEYS INVENTOR
David R. Thompson
BY Van Volkenburgh & Lowe
ATTORNEYS

3,758,967

YARD MAINTENANCE APPARATUS

This application is a continuation-in-part of my application filed July 22, 1969, Ser. No. 843,608, which issued as U.S. Pat. No. 3,579,702, on May 25, 1971 to claim subject matter disclosed but not claimed in that patent and to disclose and claim additional subject matter.

This invention relates to self-propelled yard maintenance apparatus and more particularly to yard maintenance apparatus which includes a power driven working element such as a sweeping brush, a snowplow or a lawn mower.

The primary object of the invention is to provide a novel and improved self-propelled yard maintenance apparatus having a motor which may be set to run at an optimum speed to drive the working element of the apparatus, that is a sweeping brush, snowplow auger or lawn mower reel at full speed and at the same time to propel the apparatus at a selected varying speed which may be controlled by the operator.

The invention is especially suitable for using as a powered sweeper and a sweeper will be described herein as a preferred embodiment of the invention. The ordinary sweeper consists of a short, wheel-mounted body having a handle extending rearwardly and upwardly from the body so an operator may guide the sweeper across a lawn or yard. The sweeper body carries a cylindrical brush arranged to rotate to throw debris such as lawn cuttings and leaves into a basket carried behind the body and beneath the handle of the sweeper. The sweeper is powered by an engine which rotates the brush at a selected maximum speed and the drive wheels propelling the unit at another varying speed controlled by the operator.

The present invention may also be incorporated into a snowplow wherein the engine on the unit rotates the snowplow auger at a selected maximum speed and the drive wheels propelling the unit at another varying speed controlled by the operator. Further, the invention may be incorporated into a lawn mower where the motor drives the lawn mower reel at a selected maximum speed and the drive wheels, propelling the unit, at another varying speed.

Another object of the invention is to provide a novel and improved powered driving system for a sweeper, snowplow, lawn mower or like unit, having a motor which is capable of rotating the sweeping brush or other working element at a comparatively high rate of speed to efficiently pick up debris, throw snow or mow a lawn, while at the same time rotating the drive wheels of the unit at slower and variable speeds which permits the operator to walk behind the unit at an easy pace as it moves across a lawn or along a walk.

Another object of the invention is to provide, in a motorized sweeper or the like, a novel and improved drive system which is capable of rotating the sweeper brush or other working element at a fixed rate which will be the most efficient speed of the engine, and at the same time, capable of rotating the driving wheels at a slower and varying rate to permit an operator to control the forward speed of the unit and especially, to move the same forwardly at slow speeds when the brush or working element is sweeping up large amounts of debris.

Another object of the invention is to provide, in a motorized sweeper or the like adapted to rotate a sweeper brush or working element at a fixed rate, a novel, improved and simplified variable-speed drive system for moving the sweeper forwardly at varying rates of speed, make turns or stop, all without affecting the rotation of the sweeper brush or working element.

A further object of the invention is to provide, in a motor-driven, pusher-type sweeper, a simplified and improved transmission in the drive system which may be operated by simple, manual controls which, if released intentionally or accidentally, will cause the sweeper to stop its forward movement.

Other objects of the invention are to provide a novel and improved motor driven sweeper, snowplow, lawn mower or the like, which is neat-appearing, simple, compact, economical, rugged and durable, and easily operated by anyone capable of operating a motorized lawn mower or similar equipment. As such, the units constructed according to the invention are especially useful as rental and commercial equipment.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 5 is a longitudinal section as taken from the indicated line 5—5 at FIG. 3.

FIG. 6 is a fragmentary sectional detail of an adjustment screw as taken from the indicated line 6—6 at FIG. 2, but on an enlarged scale.

FIG. 7 is a fragmentary sectional detail of the transmission unit as taken from the indicated line 7—7 at FIG. 4, but on a further enlarged scale.

FIG. 8 is a fragmentary isometric view of the several control members for the transmission unit.

FIG. 9 is a fragmentary sectional detail, as taken from the indicated line 9—9 at FIG. 8.

FIG. 10 is a diagrammatic isometric view of the driving system for the sweeper, with arrows indicating the respective direction of rotation of the several components.

FIG. 11 is a fragmentary, sectional detail similar to the arrangement shown at FIG. 9, but illustrating a modified form of the construction thereof.

FIG. 12 is a side elevation view, similar to FIG. 1, but depicting the invention as being embodied in a snow plow.

FIG. 13 is a top plan view of the snowplow shown at FIG. 12.

FIG. 18 is a diagrammatic isometric view of the driving system for the snowplow, with arrows indicating the respective direction of rotation of the several components.

FIG. 19 is a fragment of a diagrammatic isometric view of a driving system which is similar to FIG. 18, but which illustrates the use of a lawn mower reel to adapt the driving system shown at FIG. 18 for a lawn mower.

In the subsequent detailed description, the invention will be first described in its embodiment as a sweeper, which is shown at FIGS. 1 to 11.

Referring more particularly to these FIGS. 1 to 11, the improved sweeper is a wheel mounted, motorized unit having a comparatively short, wide body B with a handle H extending rearwardly from this body so that an operator may push and guide the sweeper ahead of him as when moving it across a lawn or yard. In the following description, the components forming this sweeper will be described as being oriented longitudinally when they lie in the direction of movement of this sweeper or transversely when they are transverse to the direction of movement.

Figure 2:
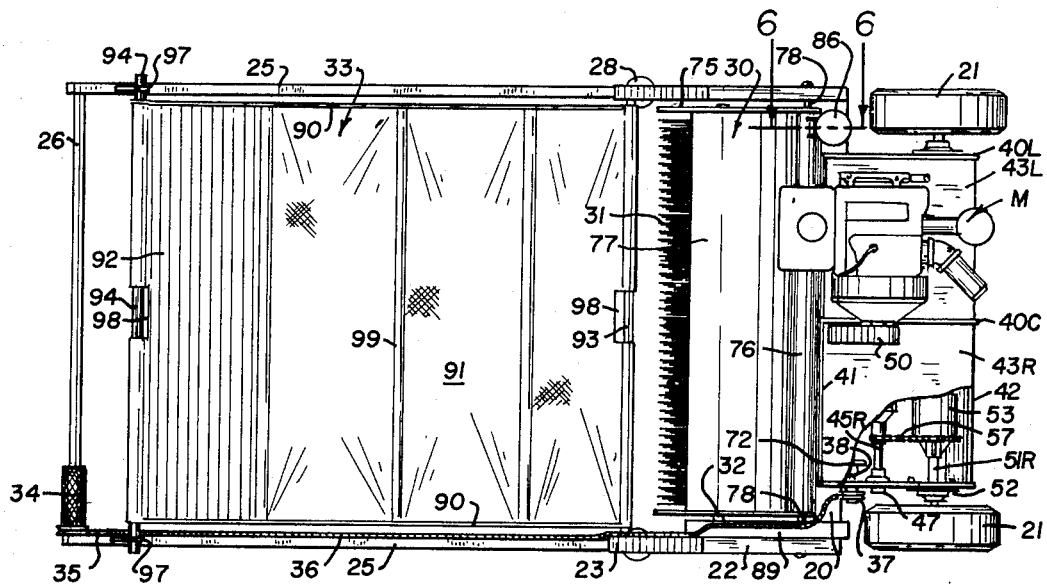
FIG. 2 is a top plan view of the sweeper shown at FIG. 1, but with a portion of a cover plate being removed to show parts otherwise hidden from view.

The body members of this sweeper, consisting of plates and beams, combine to form an integrated framework with the primary member being a transversely disposed beam 20 at the central portion of the body. Accordingly, the body may be described as having a forward section and a rear section. The forward section is formed as a box-like, compartmented structure extending forwardly from the center beam 20 as hereinafter described. This forward section is somewhat shorter, transversely, than the length of the beam to provide spaces for a pair of drive wheels 21, each of which is mounted at a side of this forward section. The rearward section is formed as a pair of longitudinally disposed arms 22, each of which extends rearwardly from an end of the central beam 20, at one side of the body. Thus, the arms provide for an open, yoke-like section at the rear of the unit. These rearwardly extending arms are projected upwardly at their rearward portion as at 23, and provide an inclined socket opening 24 at their top to hold rearwardly, and upwardly, extending side bars 25, of the handle H, as illustrated at FIG. 2. These bars, in turn, carry a transverse gripping bar 26 at their rearward ends. The wheels supporting this body include the drive wheels 21 at each side of the forward compartment and trailing wheels 27 supported upon caster swivels 28, each of which depends from the rearward end of an arm 22.

Figure 3:
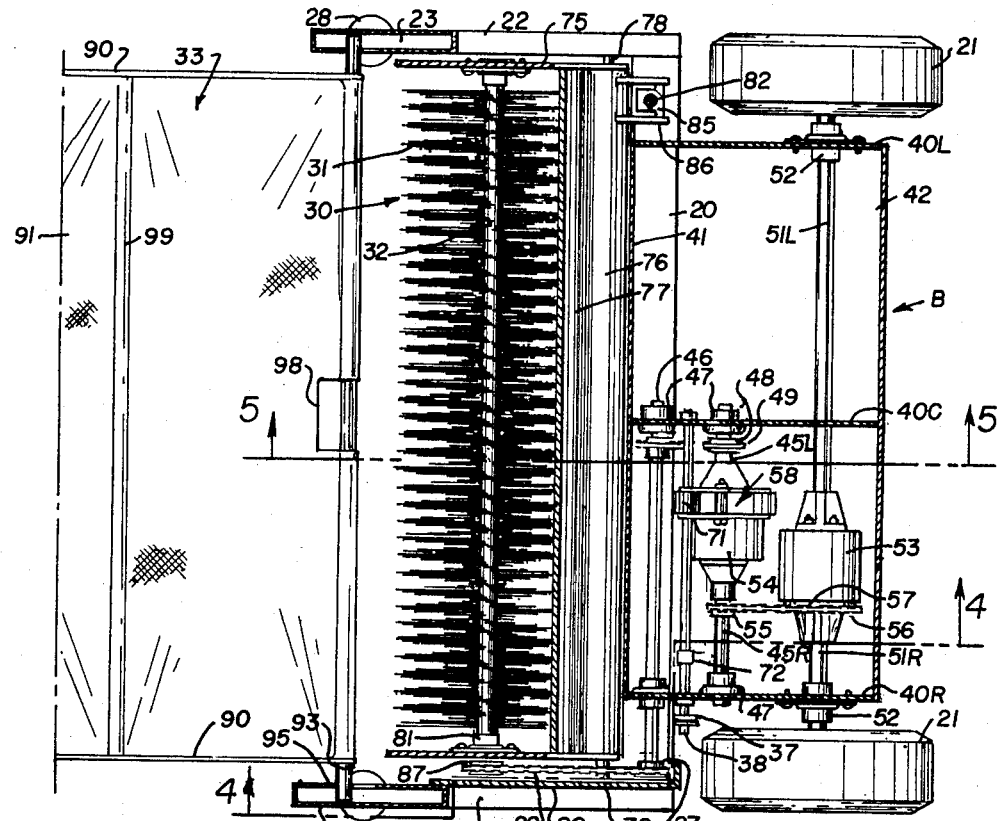
FIG. 3 is a sectional plan view as taken substantially from the indicated line 3—3 at FIG. 1, but on an enlarged scale.

This framework carries the several operative components of the sweeper. An engine M, preferably a gasoline driven engine of any conventional type suitable for the purpose, is mounted upon the deck of the forward section of the frame while the drive system, which includes shafts, sprockets and differential controls as hereinafter described, is located within a compartment in the forward section. A transversely disposed sweeper hood 30, carrying a rotatable, cylindrical sweeper brush 31, is swingably mounted in the rearward yoke portion of the frame, that is, between the rearwardly extending arms 22. The shaft 32 of the sweeper brush, FIG. 3, is operatively connected to the drive system so the sweeper may rotate to pick up debris and throw the same rearwardly from the machine. To receive such debris, a basket 33 is suspended from the rearward end of each frame arm 22 and from each side bar 25 adjacent to the rear gripping bar 26.

The controls for this apparatus will include any suitable, conventional throttle means, not shown, to regulate the speed of the engine, and a transmission drive control to regulate the forward speed of the drive wheels regardless of the speed of the engine. The handle 34 of this drive control is located at one side of the gripping bar 26 and connects with a pull cord 35 which is housed in a sheath 36 mounted alongside a side bar 34 and upon an arm 22. This cord 35 extends from the sheath and connects with a control wheel 37 mounted on the outstanding end of a shaft 38 in the forward section as hereinafter further described.

The forward section of the body B, a box-like unit, is divided into a right hand and a left hand compartment by longitudinal ribs 40R and 40L at each side, and a rib 40C at the center of the section. These ribs extend forwardly and over the beam 20 and from a transverse wall portion 41 upstanding from the beam. The front and underside of the compartments are closed by a cover plate 42 while the top of the section is closed by two deck plates 43R and 43L, one over each compartment.

In the illustrated embodiment, the engine M is mounted upon the deck plate 43L over the left side compartment. However, the drive shaft 44 of this engine overhangs the right side compartment to connect with a pair of transversely disposed, parallel transmission shafts within the right side compartment, a wheel drive transmission shaft 45L–45R and a brush drive transmission shaft 46. These two transmission shafts are carried in bearings 47 in the right, outer rib plate 40R and in the center rib plate 40C, the wheel drive transmission shaft 45L–45R being near the center of the right hand compartment and the brush drive transmission shaft 46 being near the rearward edge of the compartment. To effect the connection, the engine drive shaft 44 and the transmission shafts 45L and 46 carry sprockets 48 and are connected by a chain 49 as in the manner clearly illustrated at FIG. 5. To accommodate this chain, the deck plate 43R includes an opening adjacent to the central rib plate 40C and the chain and sprocket of the engine drive shaft, above the deck, are enclosed by a hook 50 upstanding from the deck plate.

The drive wheels 21 are mounted upon a transverse shaft 51L–51R which extends through openings in the ribs near the front end of the forward section and is held in position by bearings 52 in the outer rib plates 40L and 40R. The drive wheel shaft 51L–51R is divided into two portions which are interconnected by a differential 53. This differential, a conventional unit as hereinafter described, permits one wheel to rotate faster than the other when the sweeper is moving about a turn.

The wheel drive transmission shaft 45L–45R, which is adjacent to the wheel shaft 51L–51R, is likewise divided into two portions, a driven shaft 45L and a driving shaft 45R which are interconnected by a differential 54 similar to the differential 53. The driven section 45L is connected with the engine M, as above described. The driving section 45R connects with the wheel drive shaft differential 53 by a sprocket 55 on the shaft 45R, a sprocket 56 affixed to the differential 53 and with a chain 57 interconnecting the sprockets.

The differentials 53 and 54 are similar in construction, but the differential 54 is combined with a brake 58 to function as a transmission control as will be described. The differential 54, illustrated in section at FIG. 7, is formed as a cylindrical housing 59 with the two shaft sections 45L and 45R extending into bearings 60 in axially centered passageways at opposite sides of the housing. Each shaft section terminates within a compartment 61 within this housing and therein carries a bevel gear 62. The bevel gears 62 are, in turn, interconnected to complimentary idle bevel gears 63 which are mounted upon radial shafts 64 secured to the transmission housing.

The structure of the differential 53 on shafts 51L and 51R may be substantially identical to that above described. The action of the differential 53, to permit one drive wheel to rotate ahead of the other, is well known and need not be described. However, the action of the differential 54 and the brake 58 to function as a transmission control is now described.

When the driven section 45L of the transmission shaft is being rotated by the engine M at a substantially constant rate, the rotation of the driving section 45R and the speed at which the drive wheels 21 move the sweeper will vary depending upon the manner in which the differential 54 is being held. When the brake 58 is released and the differential is free to rotate, the driving shaft 43R will not rotate if there is any load on this shaft and the sweeper will not move forwardly for no power can be transmitted through the differential. On the other hand, when the differential 54 is held stationary by the brake, the driving shaft 45R will rotate at the same rate as the rotation of the driven shaft 45L, but in the opposite direction. When the brake 48 is partly released to permit the housing 49 to rotate slowly, by slipping of the brake, the rate of rotation of the driving shaft 45R and the movement of the sweeper will be at a reduced speed. Thus adjustments of the brake will permit the sweeper to move forwardly at any desired speed, from a stop when the brake is released, to a maximum speed when the brake is fully set. It is to be noted that the engine drive shaft must be rotated in a direction opposite to the direction of the wheel shaft 51 and in the manner as indicated by the arrows at FIG. 10.

The brake 58 is used to hold the differential stationary or to allow it to rotate at various speeds. The differential 54 includes a cylindrical, axially centered brake cylinder 65 about its body 59. A brake band 66, of a conventional, commercially available type having conventional brake shoes 67 within it, embraces this cylinder and is attached by a suitable linkage to the shaft 38 of the drive control heretofore described, the attachment providing a means for tightening the brake band about the cylinder 65 responsive to rotation of this shaft 38. The brake band 66 is available with cylindrical heads 68 and 68' at its ends and the length of the band is such as to space these heads a short distance apart, approximately 1 inch, when the band is wrapped about the cylinder 65. These heads 68 and 68a are advantageously used in attaching a brake band to the shaft 38 as will now be explained.

The linkage attaching the brake band 66 to the shaft 38 to hold the brake band in position and to tighten it about the cylinder 65 responsive to rotation of the shaft 38 may be of several varying constructions. One preferred construction of an attachment is illustrated at FIG. 9. This attachment consists of a pair of short, flat links 69 each having a hole at each end. One end of each link is mounted upon the shaft 38 to extend therefrom in spaced parallelism with the other, and the extended end of each link is attached to one side of the brake band head 68, farthest from the shaft 38, by inserting a bolt 70 through the hole of one link, through the head 68 and thence through a hole in the end of the other link. The other brake band head 68a lies between the connected head and the shaft 38 as clearly illustrated at FIGS. 8 and 9.

An eccentric cylinder 71 is affixed to the shaft 38 between the links 69 and is held at a normal position with the shorter side of the eccentric contacting the shiftable head 68a when the brake band is loose upon the cylinder 65 as illustrated at FIG. 9. However, rotation of the shaft 38 responsive to a pull of the cord 35 rotates the cylinder so that its long side pushes the heads together and locks the brake as in the manner indicated in broken lines at FIG. 9. It is contemplated that the normal position for this brake will be in its loose state where the housing 58 may rotate and where the driving shaft 45 R will remain stationary. Accordingly, to operate the sweeper to commence rotating the drive wheels, it will be necessary for the operator to shift the handle 34 in such a manner as to pull the cord 35 and set the brake. When the operator desires to stop the rotation of the drive wheels, he may simply release the handle 34, and the brake will release itself. To bias the brake to the releasing position, a lever 72 is attached to the shaft 38 and is resiliently pulled by a spring 73 connected to this lever and to the frame, the lever and spring being best illustrated at FIG. 8.

With the arrangement above described, the forward speed of the sweeper can be varied to suit the operator. However, the sweeper brush itself will rotate at substantially the same speed at all times.

A modified form of a linkage means for tightening the brake band about the cylinder is illustrated at FIG. 11. In this arrangement the brake band head 68a is threaded upon the rod 38. A U-shaped link 69a is mounted upon the other brake band head 68 and a lever arm 71a is affixed to the shaft 38 at each side of the head 68a. A swivel tube 74, pivotally mounted upon each arm 71a, is fitted upon the adjacent leg of the U-shaped link 69a and a nut 74a, which turns a threaded portion at the end of each link 69a, is used to adjust the position of the swivel tube 74 upon the link 69a. In this arrangement rotation of the shaft 38 will tighten the brake band about the cylinder 65, the same as heretofore described.

The sweeper hood 30 carrying this brush is formed as a pair of longitudinally disposed, parallel, generally triangular side plates 75 which are held together by a transverse tubular strut 76 at the forward point of the plates and an arcuate hood 77 extending about the upper portion of the plates. A pivot pin 78 extends laterally from each end of the strut and into a socket 79 in the adjacent arm 22 so that the entire assembly may swing upwardly and downwardly about this pivot pin to adjust the height of the brush above the ground and to make other adjustments as the brush is worn. The hood 77 commences at the forward end of the triangular plates at a location below the strut to extend thence upwardly and rearwardly as best illustrated at FIG. 5. A resilient flap 80 is attached to the lower edge of this hood to depend therefrom towards the ground surface at the same level as the sweeper brush. The brush is held in bearings 81 on the side plates 75.

The sweeper brush, illustrated in a raised position in the drawing, may be lowered to the ground surface, or at any selected elevation with respect to the ground surface whereon the wheels of the unit set, by swinging the sweeper hood about the axis formed by pivot pins 78 and a means is provided for adjustably raising and lowering the hood brush within it, as shown at FIG. 6. An elevating screw 82 upstands from one side of the frame member 20 and is secured thereto by a locking head 83 which permits it to rotate with the rotation being controlled by a handwheel 84. A guide nut 85 carried upon this elevating screw, is pivotally secured to a yoke 86 formed by a pair of spaced plates welded to and outstanding from the strut 76. Accordingly, manual rotation of the elevating screw to move the guide nut up or down will swing the yoke 86 to lower or raise the hood 30.

The shaft 32 of the cylindrical brush 31, mounted upon bearings 81 in the hood, is spaced such that rapid rotation of the brush will pick up debris, force it forwardly against the flap 80, thence up and around the hood to throw it rearwardly into the basket 33 behind the brush as indicated by the arrows at FIG. 5. The shaft 32 is operatively connected with the brush driving transmission shaft 46. One end of the shaft 32 extends through its side plate to carry a sprocket 87. The transmission shaft 46 also extends through the rib 40R to carry a similar sprocket 87 in alignment with the brush shaft sprocket and the two are interconnected by a chain 88. The sweeper hood is offset from a centered position between the arms 22 to allow a space sufficient to mounting these sprockets and the chain upon the apparatus, as best illustrated at FIG. 3, and the chain and sprocket are closed in a U-shaped housing 89 best illustrated at FIGS. 1 and 2.

Figure 1:
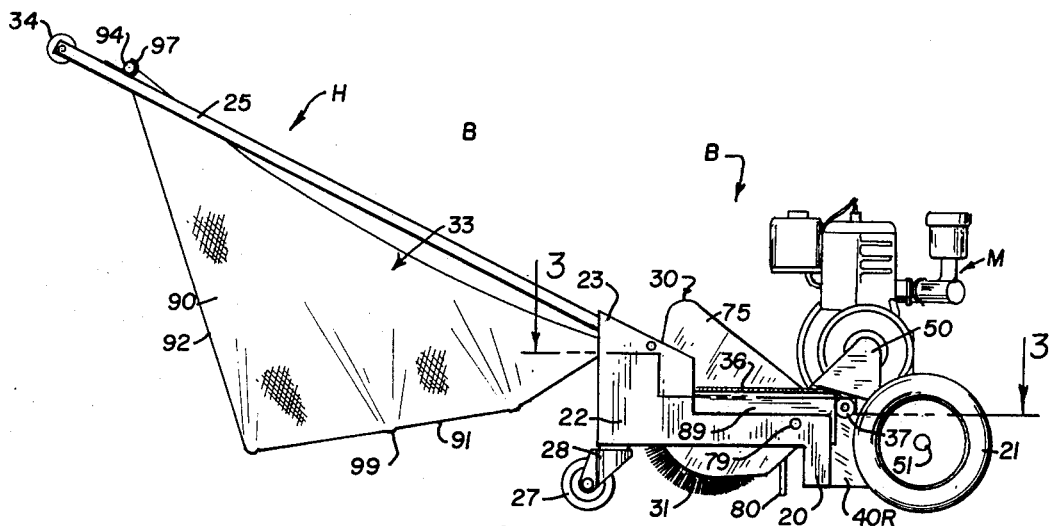
FIG. 1 is a side elevation view of the improved sweeper which will be herein described as a preferred embodiment of the invention.
Figure 4:
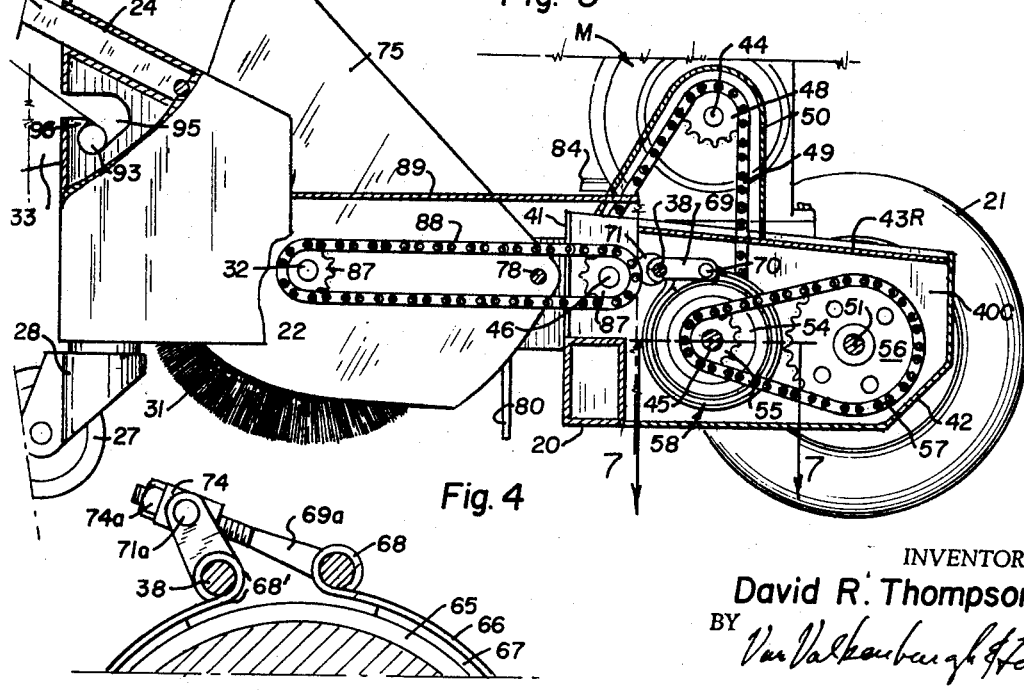
FIG. 4 is a longitudinal offset section as taken from the indicated line 4—4 at FIG. 3, but on a further enlarged scale, and with plate portions being broken away to show parts otherwise hidden from view.

The basket 33, adapted to receive debris thrown by the brush, is preferably made of canvas or similar cloth and is in a general triangular form when viewed from the side as at FIG. 1. As such, the basket consists of a pair of spaced, triangular sidewalls 90, a floor section 91 and a back wall portion 92. The forward edge of this cloth floor section is sewn as a piping through which a rod 93 extends while the top edge of the back wall is also sewn as a piping with a rod 94 extending through it. The rod 93 extends from each side of this basket a distance sufficient to permit it to be placed into a socket 95 at the inner wall of each upward extension 23 of the arms 22 as illustrated at FIGS. 3 and 4, this socket 95 being arranged with a hooked portion 96 to permit the rod 93 to be snapped in position. The rod 94 at the top of the back wall of this basket is sufficiently wide as to permit it to be secured in position upon hooks 97 on the side bars 25 of the handle as illustrated at FIGS. 1 and 2. The piping at the forward end of the floor section and at the top of the backwall is interrupted at the center of this basket by a cutout to provide gripping spaces 98 so that when a basket is removed from the sweeper, the two rods 93 and 94 may be pulled together and the operator may easily grip the rods at these cutouts 98 to hold the ends of the basket together, and hold the basket in a closed position to better retain the debris in the basket until it is ready to be emptied. To permit this cloth basket to retain a desirable, triangular form when held upon the frame and handle of the sweeper, several transverse rods may be sewn into the bottom of the basket as in the manner indicated at 99.

Many features disclosed in the sweeper, above described, can be incorporated into other equipment by changing the working element, that is, the sweeping brush 31, as to a snowplow auger, a lawn mower reel or the like. To do this it is necessary to rearrange the framework and the operative components of the apparatus. However, the mechanisms which permit the motor and working element to operate at a maximum speed while the drive wheels operate at varying speeds are essentially the same as heretofore described.

FIGS. 12 to 18 illustrate a snowplow constructed according to the invention. When compared with the sweeper, FIGS. 1 to 10, it is to be noted that the components are reversed. The snowplow auger 100 is necessarily at the front of the machine to cut into a layer of snow while the sweeper brush is conveniently at the rear of the machine. Nevertheless, many of the components of the snowplow are identical, or are substantially identical, to components of the sweeper, and this identity is indicated in the drawing and in the description by using the same numbers for the same parts but with prime marks when referring to the snowplow. A further difference to be noted between the two constructions resides in the fact that the direction of rotation of the snowplow 100, with respect to the rotation of the drive wheels 21', will be opposite to the direction of rotation of the sweeper brush 31, with respect to the rotation of its drive wheels 21. Accordingly, an additional gear will be required in the mechanism train of the snowplow to effect this reverse in the direction of rotation.

Referring more particularly to FIGS. 12 to 18, the improved snowplow is a wheel mounted, motorized unit having a body B' with the handle H' extending rearwardly from the body so the operator may push and guide the plow ahead of him when moving along a path. The body members, consisting of plates and beams, combine to form an integrated framework with the primary member being a transversely disposed beam 20' at the central portion of the body. The forward section of the body houses the snowplow auger 100. The rearward section of the body carries the drive wheels 21, the motor M and the driving and control mechanisms within compartments formed by longitudinal ribs 40L', 40R' and 40C', a wall 41', a cover plate 42' and deck plates 43R' and 43L'.

Longitudinal arms 22' extend forwardly from each end of the beam 20' to carry the snowplow housing. The housing includes side plates 101 which are affixed to the arms 22'. Bearings 102 in these side plates carry a transverse shaft 32' whereon the snowplow auger 100 is mounted. A cylindrical housing 103 between the side plates embraces the auger 100 and is supported on the framework beam 20 by clips 104 at the deck plates 43R' and 43L'. The front of the housing is open and a floor section 105 extends forwardly and tangentially at the bottom thereof. To better scoop snow into the auger opening, side wings 106 diverge from each forward edge of the side plates 101 to provide a maw of sufficient width as to cut a path of snow wider than the spacing of the drive wheels 21' behind the snowplow.

Skids 107 at each forward corner of the housing permit the unit to rest against a ground or walkway surface.

The shaft 32' carries the snowplow auger 100. The auger is essentially conventional for snowplows and is a double, opposing helical unit having each side pitched towards the center of the unit with respect to rotation forwardly and downwardly as into a snowbank whereinto the auger moves. This direction of rotation is indicated by the arrow a at FIG. 18. Each helical side thus joins the other at a central edge 108 to give the auger a balanced appearance. This auger drives snow to the center of the unit and a discharge spout 109 is formed at the top of the housing. A swing elbow 110 on the spout may be turned to various positions to direct snow from the spout to either side of the unit.

The shaft 32' extends through the bearing 102 at one side of the unit to connect with a sprocket 87', which, in turn, is connected by a chain 88' to a sprocket 87' on a transverse drive shaft 46' at the rear section of the unit, as will be hereinafter further described. These sprockets and chain are directly above a frame arm 22' and are conveniently enclosed in a housing plate 89' as illustrated.

Figures 14, 16, 17:
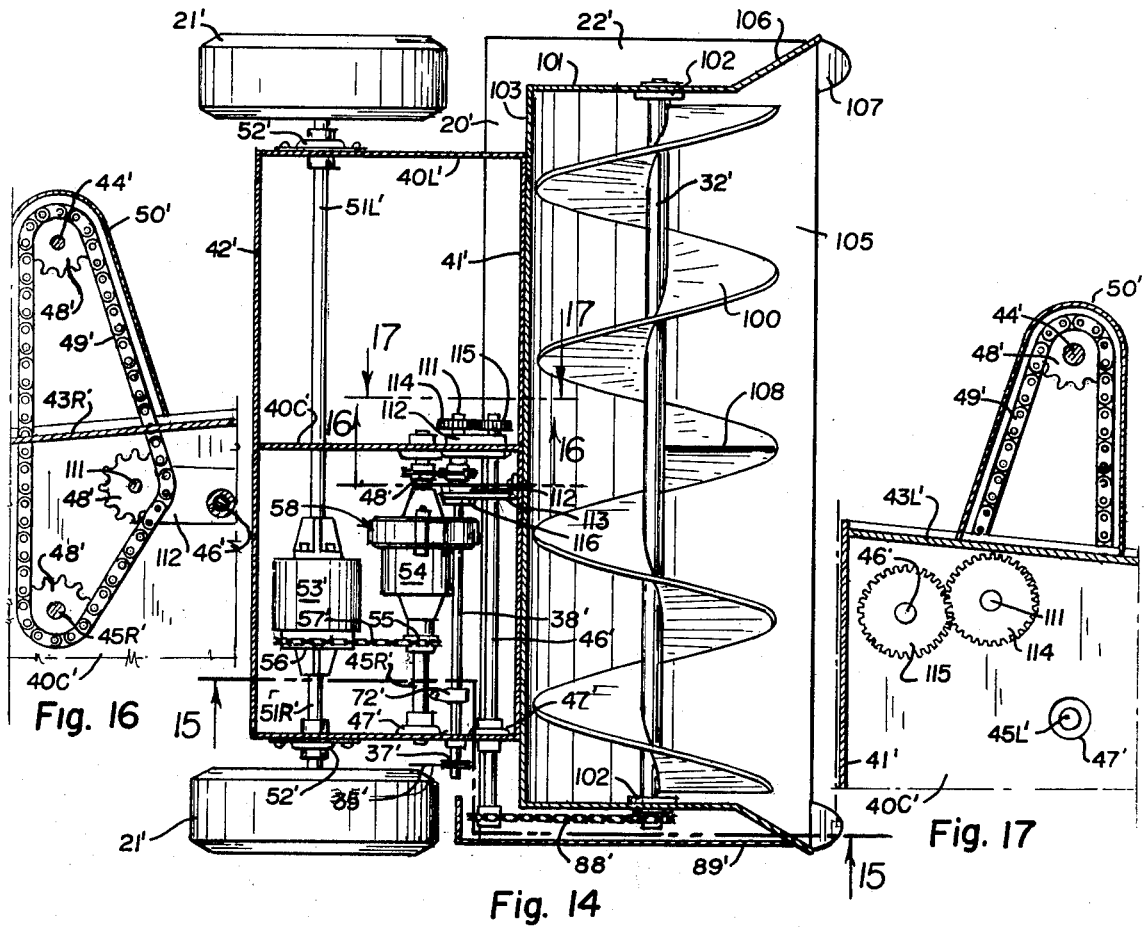
FIG. 14 is a sectional plan view as taken substantially from the indicated line 14—14 at FIG. 12, but on an enlarged scale.
FIG. 16 is a fragmentary sectional detail as taken from the indicated line 16—16 at FIG. 14, but on an enlarged scale.
FIG. 17 is a fragmentary sectional detail as taken from the indicated line 17—17 at FIG. 14, but on an enlarged scale.
Figure 15:
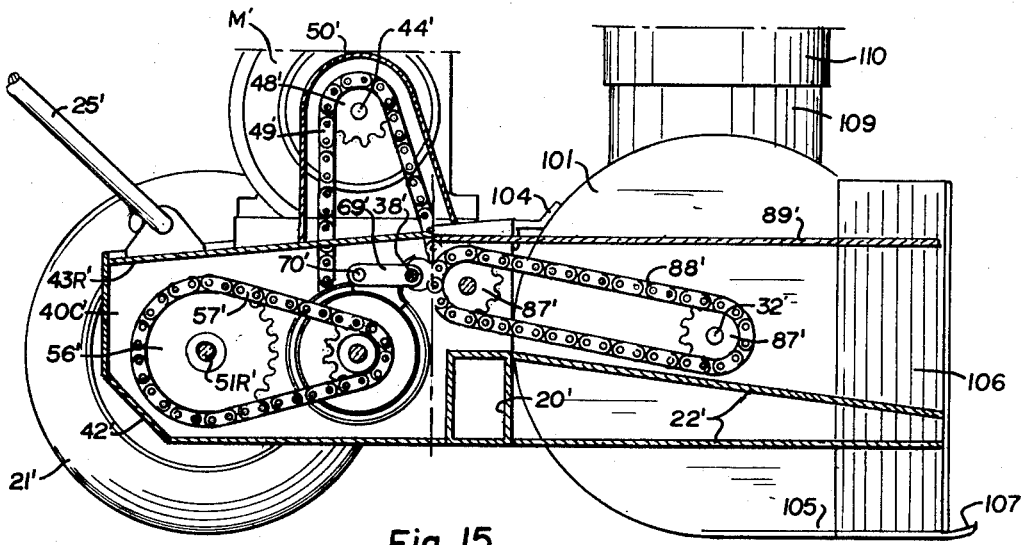
FIG. 15 is a longitudinal offset section as taken from the indicated line 15—15 at FIG. 14, but on a further enlarged scale and with plate portions being broken away to show parts otherwise hidden from view.

The box-like section at the rear of the body carries the drive mechanisms, and as heretofore mentioned, these drive mechanisms are substantially identical to the drive mechanisms of the sweeper body excepting that they are reversed in arrangement and an extra gear member is required to reverse the direction of rotation of the snowplow auger, as compared with the rotation of the sweeper brush. The reversing member is a jack shaft 111, mounted in spaced bearings 112, one bearing being at the rib 40C and another bearing being at a support clip 113, as shown in FIG. 14. A gear 114 on this shaft connects with a gear 115 on the drive shaft 46', which, in turn, connects with the auger through sprockets 87' and chain 88'. The drive shaft 44' of the engine M' connects with a wheel drive transmission shaft 45L'-45R' and the jack shaft 111 by sprockets 48' on the shafts and a chain 49' about the sprockets. Accordingly, with the train of mechanisms above described, the engine M' is direct-connected to the auger.

The engine M' is also connected to the drive wheels 21' through the wheel drive transmission shaft 45L'-45R' which, in turn, connects with the wheel shaft 51L'-51R' by sprockets 55' and 56' on the respective shafts and a chain 57' interconnecting these sprockets. As in the sweeper, the wheel shaft 51L'-51R' is divided by a differential 53' and the transmission shaft 45L'-45R' is divided by a differential 54'. Rotation of the differential 54' is controlled by a brake 58', the same as heretofore described. This brake is controlled by rotation of a shaft 38', as hereinafter described. For space clearance this shaft 38' is shown as being mounted in a bearing 116 on the clip 113 opposite the bearing 112, but with shaft 38' being independent of the jack shaft 111.

The handle 25', at the rear of the snowplow, is mounted upon brackets 117, on the plates 43L' and 43R'. A turn knob 34', on the transverse grip bar 26' of handle 25', connects with a pull cord 35' in a sheath 36' which extends to a control wheel 37' on shaft 38' as illustrated at FIG. 13. The wheel 37' is thus rotated to tighten the brake 58' to control the rotation of differential 54' and a lever 72' connected to spring 73' will bias this shaft 38' to a normal brake-releasing position, all as heretofore described.

Operation of the train of mechanisms of this snowplow may be traced from the diagrammatic illustration at FIG. 18 where arrows indicate the direction of rotation of the several shafts, drive wheels and the auger, and it is to be noted that by turning or releasing the knob 34' to turn wheel 37', the brake 58' will release to permit no movement of the drive wheels, or grip the differential for maximum speed of the drive wheels, or permit slipping to attain an intermediate speed on the drive wheels.

Other apparatus may use the arrangements herein disclosed. In FIG. 19 a lawn mower reel 120 is shown as being mounted upon a shaft 32''. This reel may be carried upon an apparatus substantially the same as the snowplow, but with the cutting reel turning against a cutter bar 121. This cutter bar will replace the floor 105 of the snowplow housing, and caster wheels, not shown, may replace the skid members 107. The drive mechanism is the same, however, with the shaft 32'' of the reel connecting with a sprocket 87'' and with a chain 88'' extending to the rear of the machine.

In the modified unit, as best shown at FIG. 18, it is to be noted that the working element positioned in front of the wheels will rotate in the same direction as the rotation of the wheels. Also, the lawn mower reel shown at FIG. 19 must rotate in the same manner to effectively cut against a cutter bar. However, if a tool such as a brush were to be placed in front of the wheels, it might then be desirable to rotate the brush in a direction opposite to the direction of rotation of the wheels. To accomplish this, a mechanism may be used which can be the same as the mechanism illustrated at FIG. 10, but the position of the components will be reversed. When so reversed, the several arrows to indicate the direction of rotation of the components, as shown in the drawing, will also be reversed.

I have now described my invention in considerable detail. However, others skilled in the art can devise and build alternate and equivalent constructions which are nevertheless within the spirit and scope of my invention. Hence, I desire my protection to be limited, not by the constructions herein shown and described, but only by the proper scope of the appended claims.

What is claimed is:

1. A wheel mounted yard maintenance apparatus or like device comprising, in combination with a body structure thereof:
   a. an engine mounted upon the body having a drive shaft adapted to rotate at a selected, substantially uniform rate;
   b. a rotatable working element carried upon the body at a location which permits the element to be positioned for working engagement at it rotates;
   c. a supporting wheel means including a driving shaft adapted to rotate and drive the apparatus;
   d. a fixed speed transmission means connecting the engine shaft with the working element to rotate the working element at a fixed rate with respect to the uniform rotation of the engine shaft;
   e. a variable speed transmission means including a driven shaft connecting with the engine shaft to rotate at a fixed rate with respect to the uniform rotation of the engine shaft and a differential means connecting the driven shaft with the aforesaid driving shaft and adapted to be set to effect rotation of the driving shaft at a selected rate with respect to the rotation of the driven shaft; and f. a control means at the differential means adapted to set the differential means to rotate the driving shaft at selected variable rates with respect to the driven shaft.

2. In the organization set forth in claim 1, wherein: the working element is a snowplow rotor.

3. In the organization defined in claim 1, wherein: the working element is a snowplow auger mounted transversely across the front of the body and wherein the supporting wheel means includes a transversely disposed wheel shaft extending through the rearward portion of the body and having drive wheels at each side of the body.

4. In the organization set forth in claim 1, wherein: the working element is a lawn cutter.

5. In the organization set forth in claim 1, wherein: the working element is a lawn mower reel mounted transversely across the front of the body; a cutter bar at the base of the reel; and wherein the supporting wheel means includes a transversely disposed wheel shaft extending through the rearward portion of the body and having drive wheels at each side of the body.

6. In the organization set forth in claim 1, wherein the driven shaft and the driving shaft are in axial alignment and the differential means is rotatably carried upon said shafts and includes a cylindrical portion having its axis congruent with the shaft axis, and including further:
a brake means having a band embracing the cylindrical portion to restrain rotation of the differential means;
said actuating means being adapted to tighten the brake means about the cylinder with selective pressure to permit the differential means to rotate at variable speeds and to remain stationary, whereby to vary the rate of rotation of the driving shaft with respect to the driven shaft.

7. In the organization set forth in claim 6, wherein: said brake actuating means includes a manually operated linkage adapted to tighten said brake band about the differential and a biased means adapted to release said brake band when the manually operated linkage is released by the operator.

8. In the organization set forth in claim 6, wherein: each shaft is connected to a gear within the differential means and each gear is interconnected to the other by an idler gear carried on the differential means, whereby the driving shaft rotates oppositely to the rotation of the driven shaft when the differential is prevented from rotating, but the driving shaft does not rotate when the differential is free to rotate.

9. In the organization set forth in claim 6, wherein: said engine shaft, said wheel shaft, said driven shaft and said driving shaft are arranged in spaced parallelism, with the driven shaft and the driving shaft being on a common axial alignment;
gear means in the differential means adapted to cause the driving shaft to rotate in a direction opposite to the rotation of the driven shaft when the differential unit is held against rotation and to remain stationary when the differential unit is free to rotate; and
chain connections directly between the driving shaft and wheel shaft, the engine shaft and driven shaft and the engine shaft and aforesaid working element, whereby the wheel shaft will rotate in a direction opposite to the direction of rotation of the working element.

10. In the organization set forth in claim 6, wherein: said engine shaft, said wheel shaft, said driven shaft and said driving shaft are arranged in spaced parallelism, with the driven shaft and the driving shaft being on a common axial alignment;
gear means in the differential means adapted to cause the driving shaft to rotate in a direction opposite to the rotation of the driven shaft when the differential unit is held against rotation and to remain stationary when the differential unit is free to rotate; and
chain connections directly between the driving shaft and wheel shaft, the engine shaft and driven shaft and the engine shaft and aforesaid working element, wherein said chain connections are interrupted by a gear connection between the engine shaft and the aforesaid working element, whereby the wheel shaft will rotate in the same direction as the rotation of the working element.

11. In the organization set forth in claim 9, wherein: said body structure is formed as a forward and rearward portion with the engine being mounted upon the forward portion thereof, with said working element being mounted at the rearward portion thereof, and with said drive shaft and transmission means being mounted within the forward portion of the unit.

12. In the organization set forth in claim 9, wherein: said body structure is formed as a forward and rearward portion with the engine being mounted upon the rearward portion thereof, with said working element being mounted at the forward portion thereof, and with said drive shaft and transmission means being mounted within the rearward portion of the unit.

13. A driving system having an engine adapted to operate with its output shaft rotating at a selected, substantially uniform rate;
a. a rotatable working element connected to the engine shaft to rotate with rotation of the engine shaft;
b. a rotatable drive element to drive the system and including a driving shaft;
c. a variable speed transmission means including a driven shaft connecting with the engine shaft, a rotatable differential means between the driven shaft and the aforesaid driving shaft to effect rotation of the driving shaft at varying selected rates with respect to the rotation of the driven shaft; and
d. a control means at the differential means adapted to set the differential means to rotate the driving shaft at selected variable rates with respect to the driven shaft.

14. In the organization set forth in claim 13, wherein: the control means includes a brake means to restrain the rotation of the differential means; and a means adapted to actuate the brake means.

15. In the organization defined in claim 13, wherein: said driven shaft and said driving shaft are on a common axial alignment; and
gear means in the differential means adapted to cause the driving shaft to rotate in a direction opposite to the rotation of the driven shaft when the differential unit is held against rotation and to remain stationary when the differential unit is free to rotate.

* * * * *